United States Patent [19]

Dupas et al.

[11] Patent Number: 5,194,283
[45] Date of Patent: Mar. 16, 1993

[54] PROCESS FOR THE MANUFACTURE OF COMPOSITE CHEESE AND PRODUCT THEREOF

[75] Inventors: Christian Dupas, Saint-Lo; Claude Parmantier, Pont-Hebert, both of France

[73] Assignee: Nestec S.A., Vevey, Switzerland

[21] Appl. No.: 396,936

[22] Filed: Aug. 21, 1989

[30] Foreign Application Priority Data

Sep. 15, 1988 [EP] European Pat. Off. ........... 88115060

[51] Int. Cl.$^5$ ............................................. A23C 19/06
[52] U.S. Cl. ..................................... 426/582; 426/89;
426/282; 426/284; 426/514; 426/516
[58] Field of Search ................. 426/89, 282, 284, 514,
426/516, 582

[56] References Cited

U.S. PATENT DOCUMENTS

| | | | |
|---|---|---|---|
| 2,640,033 | 5/1953 | Marshall | 426/516 |
| 2,777,124 | 1/1957 | Locatelli et al. | 99/460 |
| 2,872,324 | 3/1959 | Locatelli et al. | 426/61 |
| 3,480,445 | 11/1969 | Slaybaugh | 426/93 |
| 3,966,970 | 6/1976 | Williams | 426/516 |
| 4,563,358 | 1/1986 | Mercer et al. | 426/514 |
| 4,659,580 | 4/1987 | Svengren | 426/516 |
| 4,744,993 | 5/1988 | Bisson et al. | 426/516 |

FOREIGN PATENT DOCUMENTS

| | | |
|---|---|---|
| 0177175 | 4/1986 | European Pat. Off. . |
| 0260194 | 3/1988 | European Pat. Off. . |
| 2516356 | 5/1983 | France . |
| 236002 | 5/1945 | Switzerland . |
| 249359 | 4/1948 | Switzerland . |

OTHER PUBLICATIONS

Translation of French Patent Application Publication No. 2,516,356.
Boulineau, et al. (Translation of) European Patent Application No. 260,194 A3 (Mar. 16, 1988).
Webb, et al., eds *Fundamentals of Dairy Chemistry* AVI Publishing CO., Inc.: Connecticut. 1974, pages from Chapters 2 and 12.

Primary Examiner—Jeanette Hunter
Assistant Examiner—Helen Pratt
Attorney, Agent, or Firm—Vogt & O'Donnell

[57] ABSTRACT

Composite fresh or semi-hard cheeses are made from predrained lactic or rennet curds by co-extrusion and cutting into portions of various shapes. In the case of semi-hard cheeses, the portions are vacuum-wrapped in a plastic film and then ripened. The products obtained may be used as such.

18 Claims, 2 Drawing Sheets

PROCESS FOR THE MANUFACTURE OF COMPOSITE CHEESE AND PRODUCT THEREOF

BACKGROUND OF THE INVENTION

This invention relates to a process for the continuous production of composite cheese.

Extrusion has been used for many years in cheesemaking, particularly in the manufacture of cheese sticks from goat's milk curd and for the extrusion of Italian cream cheese of the mozzarella type. In cases such as these, extrusion is used solely to make pieces of a single type of curd.

It has already been proposed to make composite products having a cheese core, for example filled cereals or meat, by co-extrusion. The techniques involved are illustrated by patents and patent applications EP-A 169 919, EP-A 177 175 and U.S. Pat. No. 3,480,445. Although the exact nature of the filling is not specified, it is processed cheese capable of withstanding heat treatment because the composite product is subsequently cooked.

Processes are also known in which a processed cheese is injected with a colored curd of a different type at the filling head (cf. for example U.S. Pat. Nos. 2,777,124 and 2,872,324). According to FR-A 2,516,356, two different types of curd are coagulated under dynamic conditions in tubular elements and portions are discharged at the top of the tubes as the strand of coagulum advances. It is not possible with this method to control the properties of the curd in the absence of draining. In addition, in view of the fragility of curds in the process of formation, this technique is not applicable in practice to the efficient and continuous production of portions of co-extruded cheeses.

According to patent application FR-A 2 603 457, an already ripened pressed cheese is treated at approximately 80° C. in the presence of ultrafiltered whey proteins to produce a texture which enables it to be hot-extruded.

SUMMARY OF THE INVENTION

It has now been found that composite cheeses having the normal organoleptic characteristics of fresh or semi-hard cheeses can be produced by co-extrusion without any need for the curds to be subjected to the heat treatment normally used to make them co-extrudable.

Accordingly, the process according to the invention is characterized in that one or more drained curd(s) of cheese and, optionally, a non-cheese food composition forming the core, are co-extruded in the form of a strand at a temperature of from 0° C. to 30° C.

To carry out the process, the cheese curd(s) and, optionally, the non-cheese paste forming the central core, are fed, for example, by single or double Archimedes screws, by vacuum pumps or by any other positive pump to an extrusion nozzle or extrusion head consisting of two or more, particularly coaxial, parts.

DETAILED DESCRIPTION OF THE INVENTION

In a first embodiment of the co-extrusion process, a continuous composite strand is deposited onto a moving conveyor belt of which the linear speed is preferably adjusted to the extrusion rate. The shape of the strand is determined by the cross-section of the outlet openings, for example a central core and a surrounding outer layer. The strand is then cut into portions.

In a second embodiment of the co-extrusion process, the extrusion nozzle is a shaping head provided with a diaphragm mechanism which opens to allow the strand through and then closes to cut it. The portions are thus formed during the actual extrusion phase and may assume a rounded, spherical, cylindrical, parallelepipedic or other shape, depending on the cross-section of the extrusion orifice, the extrusion rate and the closing frequency of the diaphragm. The configuration of the central core is determined by the cross-section of the corresponding outlet opening. The portions are then deposited, for example onto a moving conveyor belt, the linear speed of the conveyor belt preferably being higher than the extrusion rate to enable the portions to be separated from one another.

In a third embodiment of the co-extrusion process, fresh, moist lactic cheese curds are packed in containers after leaving the extrusion nozzle. In this case, a portion is introduced vertically into a container from a continuous supply of products by means of a portion control mechanism. This mechanism may comprise, upstream of the nozzle, a lateral passage forming a metering chamber into which a piston draws and then discharges the portion to the nozzle by means of a rotary or oscillating plug valve. Alternatively, the tube through which the product is delivered to the nozzle may be closed by means of controlled valves downstream and then upstream of a lateral passage as described above, that section of the feed tube being situated between the two valves forming the metering chamber. In both cases, the material is first drawn into the metering chamber, the extrusion nozzle being shut off, and is then introduced through the open nozzle into a container placed beneath the nozzle by means of the piston. In this embodiment, the step-by-step nature of the extrusion process enables decorative effects to be obtained.

According to the invention, the co-extrusion process may be applied to the production of fresh cheeses from predominantly lactic curd without subsequent ripening. In this case, co-extrusion affords the possibility of contrasting for example, two different colours, flavours or textures. For this mechanical treatment, the lactic curds have to be plastic and hence relatively moist. In the context of the invention, a predominantly lactic curd means that coagulation is essentially produced by the lactic bacteria and that the rennet optionally added plays a minor role as a texturing agent so that the cheeses are cream or cottage cheeses.

In a preferred embodiment, an attractive appearance of the product is obtained by the fact that the outer part, or outer layer, of the curd is fairly firm while the core is comparatively softer to promote welding of the two curds. In order effectively to fill the core, the pressure of the inner curd is advantageously slightly higher than the pressure of the outer curd during extrusion.

The firmness of the outer curd may be obtained, for example, by employing a percentage by weight dry matter of 35 to 45% with a percentage of fats based on dry matter below 50% by weight, by keeping the curd at a low temperature, for example, around 0° C., and preferably by a combination of these measures.

The softness of the inner curd is promoted by employing a percentage by weight dry matter of 15 to 50% with a percentage of fats based on dry matter of 0 to 70% by weight, by keeping the curd at a temperature above 8° C. and preferably, by a combination of these measures.

The softness of the inner and outer curds may be increased by reducing the percentage by weight dry matter, for example to approximately 17% and, in this case, the products are packed in containers on leaving the nozzle.

The curds, particularly that of the core, may advantageously be aerated to lighten their texture. A sweet or savoury aerated curd thus assumes the form of a cheese mousse. It preferably contains from 0.5 to 3% by weight of a stabilizer, for example 1 to 2% by weight of a mono- or di-glyceride typically used in ice creams. The curd is aerated with an inert gas, for example nitrogen.

In the particular case where the curds are co-extruded into containers, it is preferred to use aerated curds containing a stabilizer, at least for the inner component, which are extruded at 0° to 16° C. and preferably at around 4° C.

Both the outer and the inner curd may be flavoured. For the savoury versions, it is possible to incorporate, for example, salt, spices, herbs, flavourings, colourants, purees or pieces of vegetables. For the sweet versions, it is possible to incorporate sugar, flavourings, colourants, pulps, jams or pieces of fruit These additions are incorporated in the drained curds before extrusion and before or after aerating.

Once formed, the portions may be coated, for example, with breadcrumbs, ground pepper, ash, etc.

Where the product is packed in containers, the containers used may be opaque or advantageously transparent to show the contrasted layers of the inner and outer products during filling.

The cheeses thus produced may be wrapped in cellophane films or aluminium foils or even preferably under nitrogen in a thermoformed, preferably transparent pack of the shell, blister or heat-sealed container type, cooled to a temperature below 8° C. and then cold-stored, for example at 4°-8° C., and distributed.

Alternatively, the co-extrusion process may be used for the production of semi-hard cheeses from a predominantly rennet curd. In this case, the extruded portions undergo subsequent ripening in a pack. For this type of use, the curd used differs very little from the curds typically made for semi-hard cheeses, such as St. Paulin, Gouda and Edam, for example. Compared with the traditional manufacture of this type of cheese, there is no moulding or pressing. Acidification takes place for a few hours in a drainage vat. The curd is then ground to obtain fine grains which are then salted and worked. At this stage, ingredients may be incorporated in the curd, including, for example, cold meats, cereals, vegetables and pieces of dried fruit.

In one particular embodiment, the core may be formed by an emulsion of meat and the outer layer by a cheese curd. The typical taste of the cheeses may also be accentuated by incorporation of either extracted or synthetic cheese flavourings.

The ground curd, optionally provided with ingredients, has physical properties at ambient temperature which enable it to be co-extruded. On leaving the nozzles, the curd may be coated, for example, with a paraffin or a wax. The curd then has to be cooled for a few minutes to a temperature below or equal to 8° C., for example to 4°-8° C. At this stage, the curd does not have the organoleptic characteristics of a semi-hard cheese and has to be ripened for a fortnight at about 10° C. To this end, the portions are vacuum-wrapped in a film of a strong plastics material. The wrapping material is selected to prevent drying of the product and its invasion by a contaminating surface flora and to allow carbon dioxide to escape. It is impermeable to water vapour and oxygen and relatively permeable to carbon dioxide. The advantage of vacuum wrapping lies in the property which the vacuum has of compacting the ground curd, thus facilitating its cohesion during ripening.

EXAMPLES AND DRAWINGS

The following Examples in conjunction with the accompanying drawings illustrate the invention. In these Examples, percentages and parts are by weight, unless otherwise stated.

EXAMPLE 1

Production of Lactic Curd

Skimmed milk containing 50% and 70% fats, based on dry matter, obtained by mixing skimmed milk and milk fats, is pasteurized for 15 s at 72° C. and then introduced into a vat at 20° C. The milk is inoculated with 1% mesophilic ferments (FLORA DANICA). After 10 minutes, rennet having a strength of 1/10,000 is added in a quantity of 3 ml per 100 l milk. The pH is 6.65. After 2 h, the milk is stirred for a few minutes. Coagulation is complete after 16 h, the pH having fallen to 4.5. The curd is cut every 3 cm. After 8 h, the serum beneath the curd is removed by opening the tank drainage valve (approx. 15% of the volume used). After gentle stirring, the curd is emptied into 40 or 60 l nylon or polyester sacks which are stacked on grids to a height of approximately 1.5 m to accelerate draining. Draining takes 6 or 7 h during which the sacks are turned over 3 times. The curd obtained from more or less skimmed or fat-enriched milk may also be drained by centrifugation and optionally mixed with fats or non-fat milk dry matter to obtain the desired composition. Ingredients are optionally incorporated in the curds in a kneader.

Co-extrusion

From a continuous vacuum-type meat filling machine comprising a hopper equipped with a helical cramming arm and a vane pump arranged beneath the hopper, the cramming arm being controlled in dependence upon the output of the pump, the drained curd containing 50% fats is forced through a nozzle formed by two coaxial tubes into the annulus between the outer tube and the inner tube. The inner tube is fed with the drained curd of 70% fats which is aerated to an overrun to 80% by volume with nitrogen in an overrunning unit equipped with a positive pump. In other cases, the drained curd of 70% fats is distributed without overrunning by a positive pump. The 50% fats curd is at 0°-8° C. and the aerated curd is at 8°-16° C., depending on the products.

The strand formed is deposited onto a conveyor belt moving at the same linear speed as the extrusion rate, cut by means of a cutter and the portions optionally are coated with breadcrumbs.

Alternatively, lactic curd containing 15.5% dry matter and 30% fats, based on dry matter, are dosed by a plug dosing unit by co-extrusion in containers at 4° C. The outer, non-aerated curd contains 1% diglyceride (CREMODAN).

The curd of the core has the same composition, but contains 2% stabilizer and is overrun to 100% with nitrogen.

Where the aerated curds contain pieces, they are incorporated after overrunning.

Products Obtained

Figure 1:
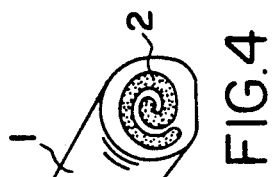
FIGS. 1-4 show fresh cheeses co-extruded in different shapes.

In FIG. 1, the stick comprises a core 2 of circular cross-section which consists of aerated, lactic curd flavoured with paprika and an outer layer 1 of annular cross-section consisting of garlic-flavoured lactic curd coated with breadcrumbs 3.

Figure 2:
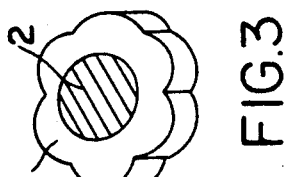

In FIG. 2, the core 2 consists of a non-aerated lactic curd blue-green in colour and flavoured with Danish blue while the outer layer 1 consists of a natural lactic curd.

Figure 3:
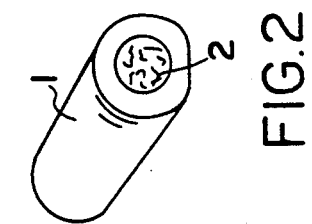

In FIG. 3, the outer tube has a scalloped cross-section. It forms an outer layer 1 of sweet, strawberry-flavoured and pink-coloured lactic curd. The inner tube is cylindrical and gives a core 2 of sweet, non-aerated orange-flavoured lactic curd yellow-orange in colour. The strand is cut at narrow intervals.

Figure 4:
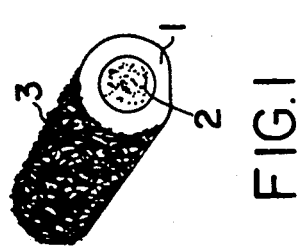

In FIG. 4, the outer tube is of circular cross-section. The inner tube has a spiral configuration. The outer layer 1 consists of a garlic-flavoured lactic curd while the core consists of a non-aerated, paprika-flavoured lactic curd. The sticks are formed in a diaphragm-type co-extruder and cut by a wire arranged at the exit of the extrusion head.

Figure 5:
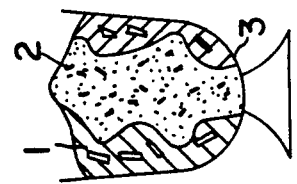
FIGS. 5-7 show diagrammatic sections through fresh cheeses co-extruded into containers.
Figure 6:
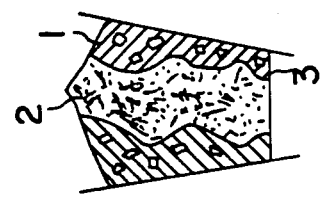

In FIGS. 5 and 6, the containers of a transparent plastics material 3 contain the lactic curd 2 forming the core overrun to 100% and containing 15% strawberry pulp and 5% sugar and the outer, non-aerated lactic curd 1 containing 22% peach pieces and 5% sugar.

Figure 7:
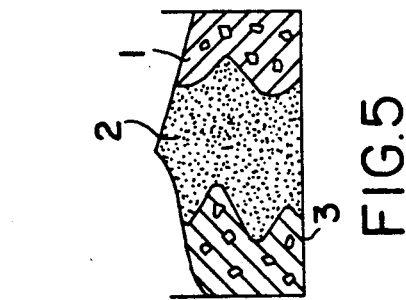

In FIG. 7, the transparent container 3 in the form of a cup contains the core cheese 2 overrun to 100% and containing 1% salt, small pieces of tomato and tomato concentrate, the tomato representing 15%. The outer cheese layer 1 contains 1% salt and 22% pieces of leek.

EXAMPLE 2

Production of Rennet Curd

Milk containing 3.5% fats is pasteurized for 15 s at 72° C. and cooled to 32° C. in a vat. The milk is inoculated at 32° C. with 1% mesophilic ferments (FLORA DANICA), after which 1/10,000 rennet is added in a quantity of 30 ml to 100 l milk. Coagulation takes place over 35 minutes at 32° C. The curd is then cut into approximately 8 mm cubes in 10 minutes and then stirred for 15 minutes. The serum is then removed, corresponding to approximately 50% of the volume of milk used. Water is added at 30° C. in a volume equivalent to the volume of serum removed, followed by stirring for 10 minutes. The serum, corresponding to approximately 50% of the volume of milk used, is then removed and the curd is placed in a drainage vat.

The curd is left to acidify for about 5 h at 25° C. to a pH of 5.1. The curd contains 50% dry matter and 50% fats based on dry matter.

The curd is ground in a mill for 3–5 mins. in batches of 20 kg in a 40 l bowl until grains approximately 1 mm in diameter are obtained. The ground curd is then salted with 1.5% salt and worked.

Ingredients are optionally incorporated in the curd in a kneader.

Co-extrusion

Co-extrusion may be carried out as in Example 1 either by forming a continuous strand at 25°–30° C., which is then cut into portions, or by directly producing the portions in a diaphragm extruder. The portions are then cooled for a few minutes at 4°–8° C. to firm them.

Wrapping—Ripening

The portions are vacuum-wrapped in a film of a plastics material (GRACE-CRYOVAC BB4) which is hermetically sealed, after which the wrapped portions are stored in a ripening room for 15 days at 10° C.

Products Obtained

Figure 9:
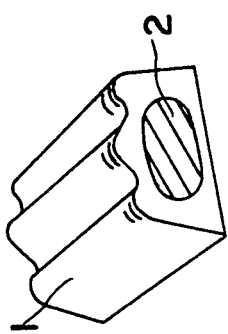
Figure 8:
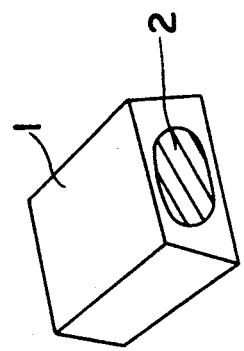

In FIGS. 8 and 9, the outer layer 1 consists of a curd of St. Paulin and the core 2 of a curd of Edam. The portions are obtained from a continuous strand delivered on a conveyor belt and then cut into portions.

Figure 10:
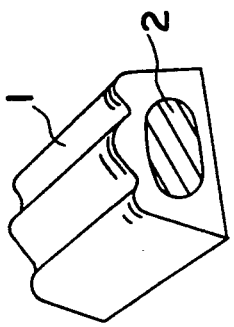
FIGS. 8-13 show semi-hard cheeses co-extruded in different shapes.

In FIG. 10, the outer layer 1 consists of a curd of Edam and the core 2 of an emulsion of cold meats. The portions are co-extruded and cut in the same way as for the product shown in FIGS. 8 and 9.

Figure 12:
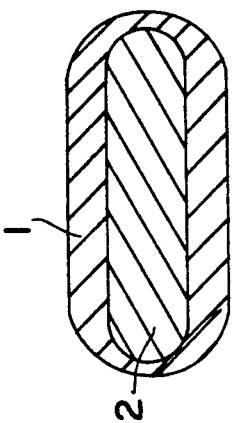
Figure 11:
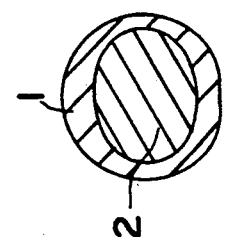

In FIGS. 11 and 12, the composite cheeses shown in section consist of an outer curd of St. Paulin and an inner curd of Edam. They are obtained by means of a diaphragm co-extruder, the rounded, spherical or elongate shape obtained depending on the more or less rapid opening and closing frequency of the diaphragm in keeping with the co-extrusion rate.

Figure 13:
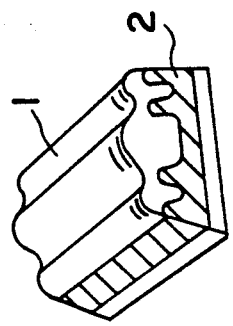

In FIG. 13, the configuration of the composite cheese is different because it consists of a central layer 2 of Edam-type curd between two layers 1 of St. Paulin-type curd. The portions are obtained by means of a diaphragm co-extruder, the nozzle being divided into compartments by dividing walls.

We claim:

1. A process for the production of a composite cheese product comprising co-extruding materials consisting essentially of two differing unripened drained curds at a temperature of from 0° C. to 30° C. into a form of a strand such that one extruded curd forms a core of the strand and such that one extruded curd forms a layer about the core.

2. A process according to claim 1 further comprising cutting the extruded strand into portions, wrapping the cut portions and then cooling the wrapped portions to a temperature below 8° C.

3. A process according to claim 1 wherein the curds have been coagulated by lactic bacteria.

4. A process according to claim 3 further comprising aerating the curd to be extruded as the core with an inert gas.

5. A process according to claim 3 wherein the extruded layer about the core is firmer than the core.

6. A process according to claim 3 wherein the extruded layer about the core has a percentage by weight dry matter of from 35% to 45% and a percentage of fats based on dry matter below 50% by weight and the core has a percentage by weight dry matter of from 15% to 50% and a percentage of fats based on dry matter of up to 70% by weight.

7. A process according to claim 3 or 6 wherein the extruded layer about the core is extruded at a temperature of from 0° C. to 8° C. and the extruded core is extruded at a temperature of from 8° C. to 16° C.

8. A process according to claim 3 or 6 wherein the curds contain from 0.5% to 3% by weight of a stabilizer selected from the group of stabilizers consisting of a monoglyceride and a diglyceride.

9. A process according to claim 1 wherein the curds have been coagulated with rennet and further comprising vacuum wrapping portions of the extruded strands in a film of plastics material which is impermeable to water vapor and oxygen and permeable to carbon dioxide such that the curds ripen in the film.

10. A process according to claim 9 wherein the curds are co-extruded at a temperature of from 25° C. to 30° C. and further comprising cooling the extruded strands to a temperature below 8° C. to firm the extruded strands and then wrapping the portions of the firmed strands.

11. A process for the production of a food product comprising co-extruding a curd consisting essentially of unripened rennet coagulated drained curd and materials selected from the group of materials consisting of an emulsion f meats, cereals, vegetables and dried fruit at a temperature of from 0° C. to 30° C. into a form of a strand such that the extruded materials form a core of the strand and such that the extruded curd forms a layer about the core, cooling the extruded strand to a temperature below 8° C. to firm the extruded strand and then vacuum wrapping portions of the firmed strand in a film of plastic material which is impermeable to water vapor and oxygen and permeable to carbon dioxide such that the curd ripens in the film.

12. The product of the process of claim 1, 3, 6, or 8.

13. The product of the process of claim 11.

14. A composite cheese-making curd product comprising strands consisting essentially of two differing co-extruded unripened drained curds wherein one extruded curd forms a core of the strand and one extruded curd forms a layer about the core.

15. A product according to claim 14 wherein the cheese curds are lactic curds.

16. A product according to claim 14 wherein the extruded layer about the core has a percentage by weight dry matter of from 35% to 45% and a percentage of fats based on dry matter below 50% by weight and the core has a percentage by weight dry matter of from 15% to 50% and a percentage of fats based on dry matter of up to 70% by weight.

17. A product according to claim 14 wherein the curds contain from 0.5% to 3% by weight of a stabilizer selected from the group of stabilizers consisting of a monoglyceride and a diglyceride.

18. A composite food product comprising strands of a co-extruded composite of ripened rennet drained cheese curd and a material selected from the group of materials consisting of an emulsion of meats, cereals, vegetables and dried fruit wherein the extruded material forms a core of the strand and the ripened curd forms a layer about the core.

* * * * *

UNITED STATES PATENT AND TRADEMARK OFFICE
CERTIFICATE OF CORRECTION

PATENT NO.   : 5,194,283
DATED        : March 16, 1993
INVENTOR(S)  : Christian DUPAS, et al.

It is certified that error appears in the above-identified patent and that said Letters Patent is hereby corrected as shown below:

Column 7, line 23, (line 5 of claim 11), "f" should be --of--.

Signed and Sealed this

Sixteenth Day of November, 1993

Attest:

BRUCE LEHMAN

Attesting Officer         Commissioner of Patents and Trademarks